Dec. 6, 1960    J. C. HOELLE    2,963,203
FUEL PUMP MOUNTING
Filed Nov. 21, 1958    3 Sheets-Sheet 1

INVENTOR.
JAMES C. HOELLE
BY *Selby, Lock & Jenkins*
ATTORNEYS

Dec. 6, 1960  J. C. HOELLE  2,963,203
FUEL PUMP MOUNTING
Filed Nov. 21, 1958  3 Sheets-Sheet 2
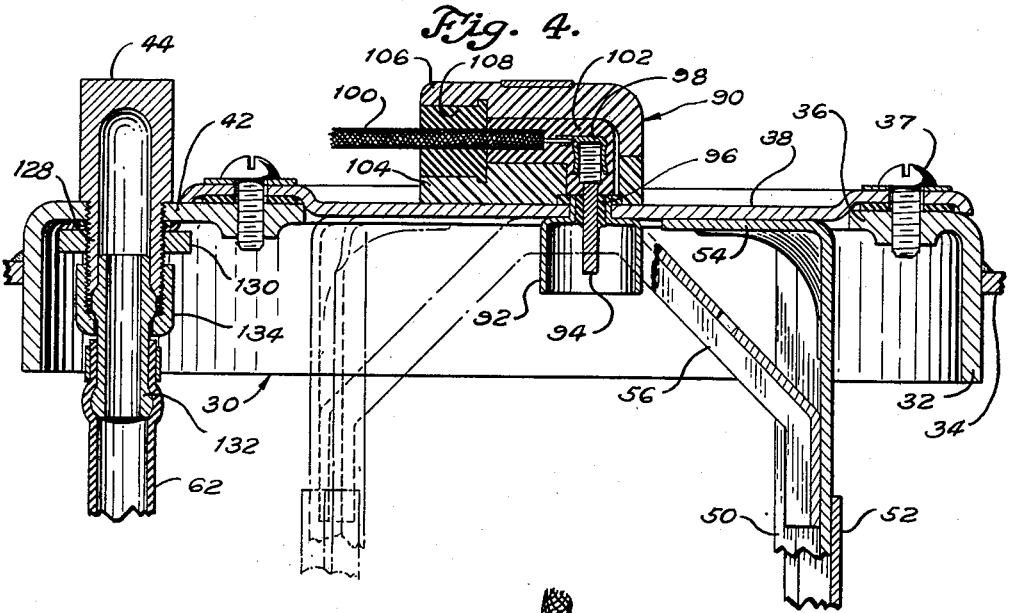
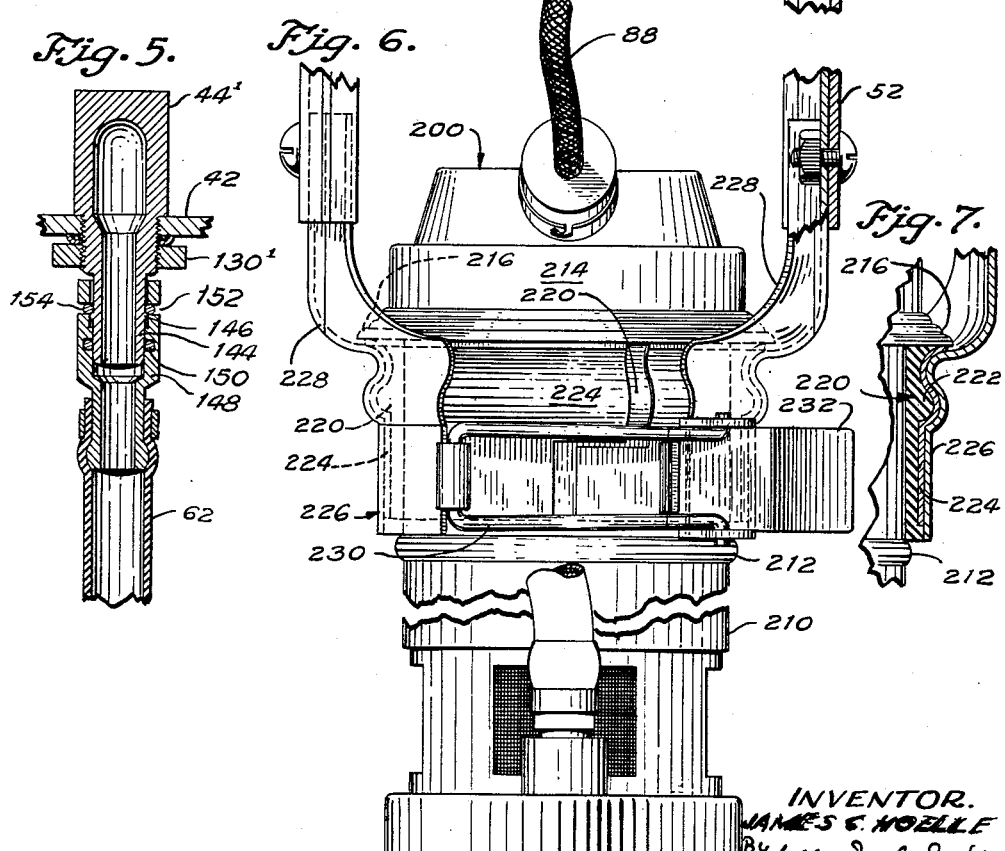
INVENTOR.
JAMES C. HOELLE
BY
ATTORNEYS.

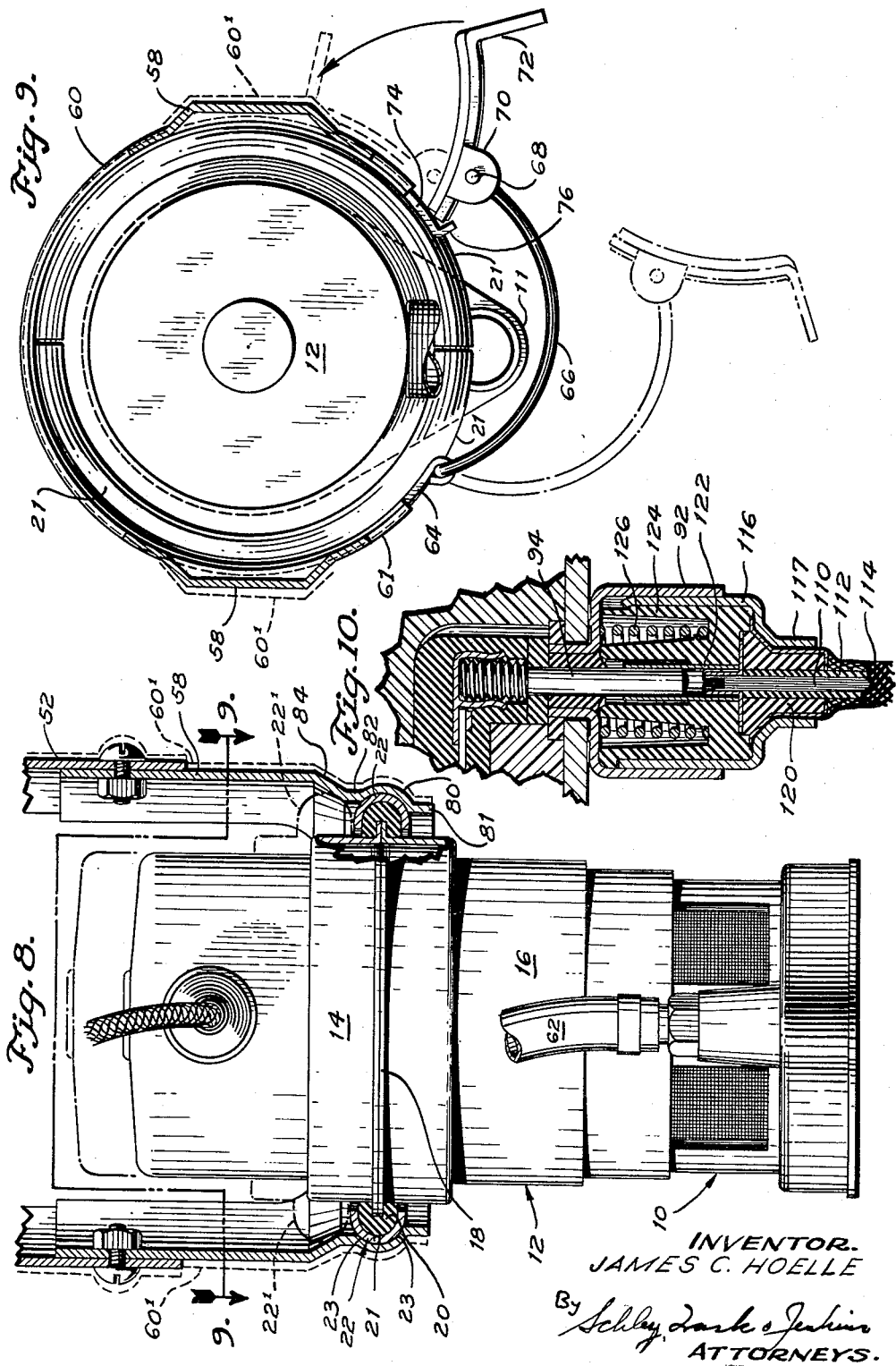

United States Patent Office 2,963,203
Patented Dec. 6, 1960

2,963,203

FUEL PUMP MOUNTING

James C. Hoelle, Fort Wayne, Ind., assignor to Tokheim Corporation, Fort Wayne, Ind., a corporation of Indiana Filed Nov. 21, 1958, Ser. No. 775,622

10 Claims. (Cl. 222—333)

This invention relates to a mounting for supporting and locating a motor-pump unit in a fuel tank such as the gasoline tank of an automotive vehicle.

It is the object of the invention to provide an improved mounting carried by the top of the tank. It is a further object of the invention to provide a mounting in which a motor-pump unit is suspended from above and in which the unit is readily insertable and removable from the mounting and is held by a mounting clamp which in clamped position about the motor-pump unit acts to reinforce and stiffen the mounting. It is a further object of the invention to provide a mounting in which the motor-pump unit can be readily removed from the tank without breaking any external joints in the fuel line.

In accordance with one aspect of the invention, the mounting comprises a mounting member, preferably a straight sided ring or bell, which is adapted to be fixed in or on the top wall of a tank, as by welding the same to the top wall. Such member provides an access opening surrounded by a seat for a cover plate or bracket support which carries a hanger, such as a pair of depending legs, connected to a C-shaped clamp which receives and supports the motor-pump unit. The C-clamp desirably has inner circumferentially disposed shoulders or the like forming an inwardly facing seat to engage and be clamped about an inter-fitting shouldered mounting face extending circumferentially of the motor-pump unit. Preferably, the seat is concave and the face convex, but opposite or other arrangements may be used. The C-clamp provides a clear opening at one side to pass the discharge extension and conduit out of the pump when the unit is inserted in the C-clamp, and such opening is closed by a tension clamp releasably connecting the free ends of the C-clamp. Such clamp is preferably a toggle clamp. The depending legs are rigidly fixed to the mounting bracket, and the C-clamp firmly interconnects their lower ends, but the legs and C-clamp are sufficiently flexible to yield outward or to flex inward or both during insertion and subsequent clamping of the motor-pump unit. In clamped position the clamp firmly grips the circumferential mounting face of the motor-pump unit and forms a stiff reinforcement for and between the depending hanger legs; and the assembled bracket, hanger, C-clamp, and motor-pump unit forms a self-contained firm mounting assembly which may be inserted and removed from the tank as such.

In accordance with another aspect of the invention, the motor-pump unit is carried in depending relation from a cover plate which mounts on a mounting ring adapted to be fixed to the top of the tank, and such unit is removable in a self-contained mounting assembly with the cover plate; and the mounting ring has a substantial area of free top wall which carries a conduit fitting which can be permanently secured to a fuel line extending from the tank, while the pump has a fuel conduit releasably connectible to such fitting inside the tank. This inside connection is made by a readily releasable connector, preferably a "quick connector" which is operated by simply positioning its two elements together in telescopic relation.

The accompanying drawings illustrate the invention. In such drawings:

Fig. 4 is a vertical section of the upper portion of the mounting shown in Figs. 1 and 2, taken on the line 4—4 of Fig. 2;

Fig. 5 is a fragmental section showing a quick connector between the pump discharge conduit and the conduit fitting;

Fig. 6 is a front elevation of a modification for mounting a motor-pump unit of different configuration;

Fig. 7 is a fragmental sectional view of the mounting shown in Fig. 6;

Fig. 8 is a vertical section of the lower portion of the mounting shown in Fig. 1;

Fig. 9 is a section taken on the line 9—9 of Fig. 8; and

Fig. 10 is an axial section on an enlarged scale of an electric terminal connector.

Figures 1, 2, 3:
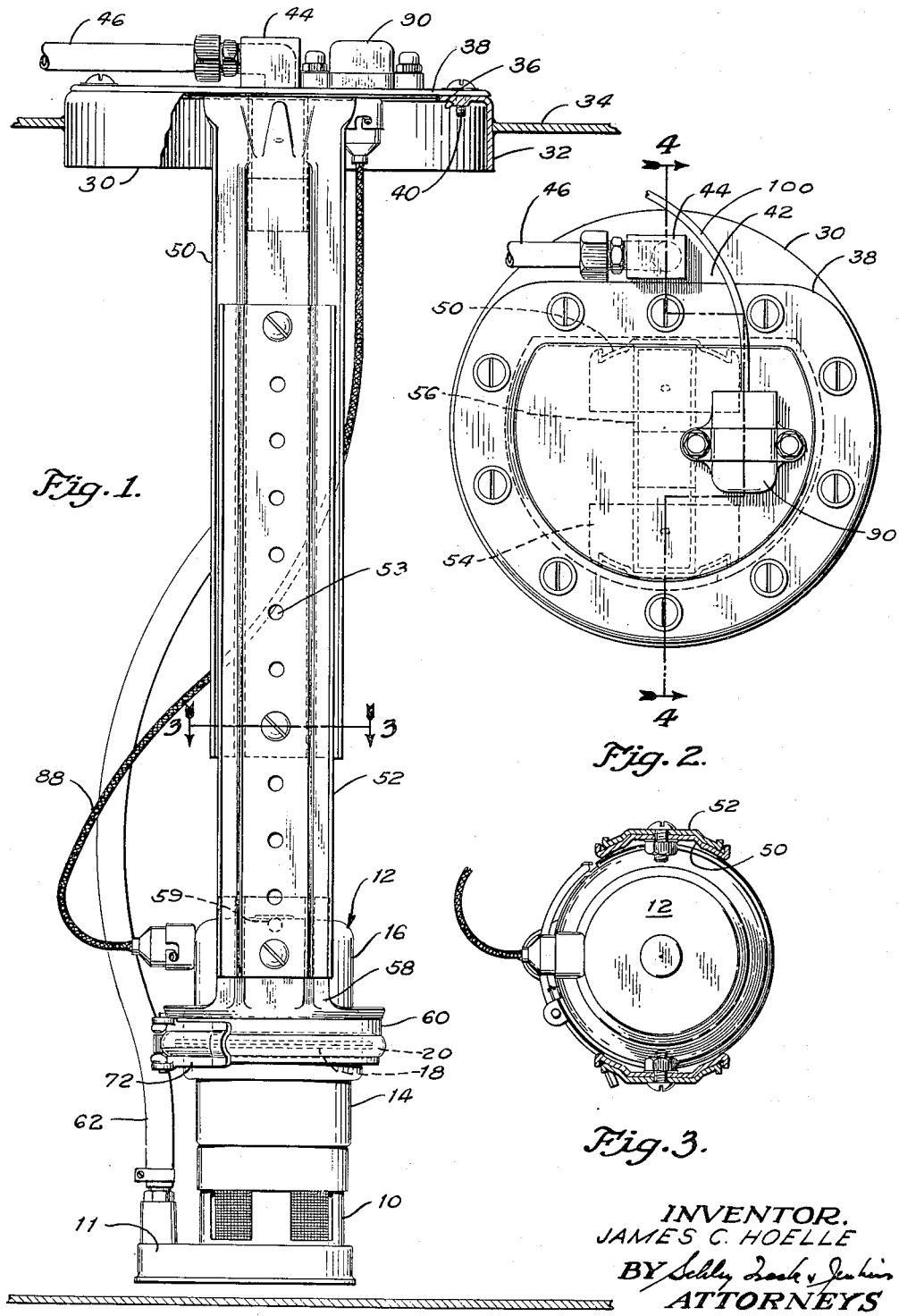
Fig. 1 is a side elevation of a mounting embodying the invention.
Fig. 2 is a top plan view of the mounting shown in Fig. 1.
Fig. 3 is a section taken on the line 3—3 of Fig. 1.

The motor-pump unit shown in Figs. 1–3 and 8, and features thereof providing its annular mounting face are more fully described and claimed in co-pending application Serial No. 701,047, filed December 6, 1957; and the electrical cable and terminal connectors shown are more fully described and claimed in co-pending application Serial No. 845,027, filed October 7, 1959.

The motor-pump unit shown in Figs. 1 and 8 comprises a bottom pump 10 assembled with a motor 12 enclosed in an external housing comprising a pair of hat-shaped shells 14 and 16 whose rims (Fig. 8) are welded together in face-to-face relation to form an outstanding flange 18 extending circumferentially about the center of the motor assembly 12. This circumferential flange 18 encircles the main mass of the pump-motor unit and is thus advantageously positioned for use as a mounting flange. To this end, a channel-shaped cushion strip 20 of elastomer material or the like is placed about the flange 18 with its inner channel faces engaging the side faces of the flange 18 and its side legs abutting the outer wall of the motor housing. The cushion strip 20 is held in place about the motor, as a substantially self-contained assembly, by a pair of half-circle retainer rings 21, which are of channel section with a semi-circular bottom or outer portion merging at its edges into short tangential and parallel side-wall or flange portions which project inward toward, but terminate short of, the side wall of the motor housing. The retainer rings 21 grip the cushion strip 20 to retain themselves and the cushion strip in place.

The rings 21 together form a substantially continuous circumferential mounting collar 22 about the motor-pump unit 10—12, and present an outwardly convex mounting face substantially in the form of the outwardly convex face of a torus. The flanks 23 of such convex face slope inward in opposite directions to form oppositely presented sloping shoulders for nesting engagement with corresponding shoulders of a channel seat formed in the mounting clamp described below. Various other configurations of mounting face may be used, either convex or concave, and either of rounded or of angular cross-section; all of which will generally include oppositely-presented straight or sloping shoulders for nesting engagement with a complementary seat of the mounting clamp.

The mounting shown in Fig. 1 comprises a mounting member 30 in the form of a ring having a flat top wall and a cylindrical side wall 32, which is adapted to be inserted into a circular opening in any of various shapes of top wall 34 of a fuel tank, and to be welded therein. The mounting ring has a central opening bordered by an inwardly extending flat seat 36 for a mounting bracket and cover plate 38, which is held in place by a series of screws 37 passed through the cover plate and into threaded holes in the flange 36. Desirably, the plate 38 and the opening defined by the flange 36 are both D-shaped, to leave a considerable clear area 42 on the top wall of the mounting member 30. An outlet conduit fitting 44 is mounted in this clear area of the mounting member 30, and may be permanently connected to a fuel line 46.

The cover plate 38 carries a pair of spaced depending legs. As shown, these are of extensible construction, each including a fixed leg 50 and an extension member 52. The two members 50 and 52 are of angularly dished cross-section to give a shallow ribbed channel configuration which stiffens each member and provides interengaging longitudinal surfaces between them, and both members are provided with a plurality of regularly spaced bolt holes 53. They may be secured together in several positions of longitudinal adjustment, to provide substantially rigid legs of a length to suit the desired installation. The fixed legs 50 are rigidly secured to the cover plate 38, as by welding and suitable bracing. As shown in Fig. 4, each member 50 has an in-turned upper end 54 welded to the underside of the plate 38, and the two legs 50 are braced by an angle brace member 56 welded at its center to the plate 38 and at its ends to the legs 50.

A mounting clamp 60 is connected to the depending legs 50—52 at their lower ends, at a desired level, usually adjacent the lower ends of the legs. When a short mount is desired, the extension section 52 may be omitted and the clamp secured directly to the legs 50. In either case, the connection is made by means of a pair of upstanding ears 58 at the sides of the C-clamp 60, which are shaped to interfit with the channel configuration of the legs, so that when the clamp and legs are bolted together, the C-clamp is firmly connected to both legs, to connect them to each other and brace them. The legs and clamp 60 thus form an interconnected depending structure rigidly carried by the cover plate 38. Desirably the holes 53 of the legs 50—52 are spaced at 1-inch intervals, and the ears 58 each have a pair of holes 59 spaced ½ inch apart, which permits location of the clamp 60 at ½ inch intervals over a wide range.

As is best shown in Fig. 9, the C-shaped clamp member extends through an arc of the order of 300° and provides a relatively wide gap at its front portion, to facilitate the insertion of the pump 10 with its forwardly projecting discharge nose 11 and to pass the discharge conduit 62 connected to the pump. The free ends of the C-clamp are connected by a tension clamp, preferably a toggle clamp such as shown in Fig. 9. The counter-clockwise end of the C-clamp carries a tongue 64 which is looped about the center bight of a U-shaped wire spring member 66. The side members of the wire spring member 66 are desirably curved about an arc of greater curvature than the C-clamp 60, and their free ends are turned outward to form pins 68 received in ears 70 of a toggle latch member 72. The clockwise end of the C-shaped clamp 60 carries a tongue 74 whose end is turned outward to form a hook 76 for the reception of the toggle latch 72. In Fig. 9 the tension latch is shown in full lines in a position of initial engagement of the latch 72 with the hook 76. The tension latch 66—72 may be disengaged from the hook 76 and swung to the left, as indicated by the chain-line position shown in Fig. 9, to leave clear the opening in the C-clamp 60. Conversely, the toggle latch member 72 may be swung to the right from the position shown in full lines in Fig. 9 to draw the free ends of the C-clamp together, and tighten it as a band about the motor-pump unit mounted therein. At the end of this movement of the latch 72 to the right, as to the position indicated in dotted lines, the toggle moves past dead center and locks itself in latched position.

The C-clamp 60 is formed in cross-section to provide a shouldered mounting seat, and to stiffen it in its function as a reinforcing brace between the two legs 50—52. The clamp 60 shown in Fig. 8 has an inwardly-facing shallow channel section 80, formed to receive the convex mounting collar 22 of the pump-motor unit. The channel 80 is connected at the bottom to a short straight section 81, and at the top to a second straight section 82 connected to an outwardly flared throat section 84.

In the operation of inserting a motor-pump unit in the mounting, the pump is passed through the opening of the clamp while the tension latch is in open position, and mounting collar 22 is first rested in the throat section 84, as in the broken line position 22' shown in Fig. 8; the unit is then pushed down to force the collar 22 through the straight section 82 into the seat 80. To facilitate this action, the top straight section 82 is slightly smaller than the uncompressed size of the collar 22, to pass that collar with only a moderate amount of outward flexing of the clamp 60, as indicated by the dotted lines 60' in Figs. 8 and 9. The bottom half of the seat 80 desirably extends inward farther than the top half and the bottom straight section 81 is smaller than the top section 82, to act as a stop to stop the mounting collar 22 when it reaches proper position in the seat 80. When the motor-pump unit is thus seated in the channel 80, the tension latch 66—72 is swung to closed position as shown in full lines in Fig. 9, and the toggle 72 moved to the right to its locked position, where it draws the C-clamp tightly as a band about the shouldered mounting collar of the motor-pump unit.

The mounting structure formed by the cover plate 38, the extensible legs 50, and the interconnecting C-clamp 60 is a substantially rigid structure, yet the legs and C-clamp are sufficiently flexible and resilient to permit the the C-clamp to yield outward as a motor pump unit is inserted to its mounted position and to pull inward as the tension latch is closed. When closed and locked about the motor-pump unit, the clamp 60 and the collar 22 become a substantially rigid band which interconnects and braces the two legs 50—52 to form a solid support in which the pump is carried by the cushion 20.

The motor 12 is electrically connected by a cable 88 to a terminal fitting 90 on the mounting plate 38. Such cable has a separable connector at one or preferably both ends, and the arrangement is such that the electrical connections which will be positioned within the tank can be completed in the self-contained mounting assembly before the same is inserted in the tank, so that the final electrical connections will normally be made after the pump is in mounted position and the tank closed.

As shown in Figs. 1, 2, and 4, the terminal fitting 90 comprises a receptacle cup 92 having a reduced extension in which a connector pin 94 is fixed and insulated by a fused seal 96. The cup assembly is fixed and sealed to the wall 38 as by welding or soldering, with the reduced portion and the pin extending through the wall. The upper end of the pin 94 is serrated to retain a connector clip 98 connected to the supply wire 100. The clip 98 is insulated by a boot 102 and the connection is housed between a base 104 and a cover 106 closed by a grommet 108.

The bottom end of the pin 94 is engaged by a plug on the end of the cable 88, as shown in Fig. 10. The cable comprises a central wire 110, an insulating sheath 112, and a braided wire cover 114. The plug comprises a necked sleeve 116 of a size to be received in the receptacle cup 92 and retained therein by a bayonet joint. The cable cover 114 is engaged against the inner face of the sleeve neck 117 and held therein by a flanged cup surrounding an insulating plug 120 which passes the wire 110 and its sheath 112. A tubular clip 122 is connected to the wire 110 and held centrally in the sleeve 116 by a filler block 124, in position to engage the lower end of the pin 94. The sleeve 116 may be crimped into notches in the block 124 to hold the assembly together, and a spring 126 is desirably provided to releasably lock the bayonet connection. A similar plug at the other end of the cable 88 connects the same to the motor 12.

The connection of the pump discharge conduit 62 to the discharge fitting 44 is made inside the tank, at the lower end of the fitting 44. The connection is desirably a readily releasable one and may be a threaded fitting as shown in Fig. 4 or preferably a quick-connector fitting as shown in Fig. 5. In the structure shown in Fig. 4, the fitting 44 has a threaded shank 128 extending through the upper wall 42 of the mounting ring 30 and secured and sealed therein by a gasket and nut 130. The lower threaded end of the fitting shank 128 is formed to receive a nipple 132 connected to the upper end of the pump conduit 62. The nipple is releasably connected to the fitting by a compression nut 134.

In the modification shown in Fig. 5, the discharge fitting 44' is held in place through the wall 42 by a nut 130', and its lower end is formed as a cylindrical nipple 144 having a circumferential ridge 146 intermediate its length. A coupling member 148 connected to the pump discharge conduit 62 slides over the nipple 144 and is sealed thereto by an O-ring 150. Adjacent its upper end, the connector sleeve is provided with a pair of opposite slots 152 which carries a hair pin cotter 154 which engages over the ridge 146 to retain the connector in place.

Figs. 6 and 7 show a modification for mounting a motor-pump unit 200 of different configuration. The unit 200 comprises a main cylindrical casing 210 having a circumferential bead 212 intermediate its length, and closed at the top by a cap 214 provided with an outward flange 216 at its lower edge. A strip of rubber-like material is wrapped about the cylindrical surface of the motor housing to form a cushion 220 between the cap 216 and the circumferential rib 212. Such cushion has a shouldered cross-sectional shape and as shown is provided with an enlargement 222 which forms a circumferential rib about the motor-pump unit. The cushion 220 is surrounded and held in place by a conforming split ring collar 224 formed to mate with the configuration of the cushion 220. The clamp for mounting this motor-pump unit is similar to that shown in Fig. 1. It includes a C-clamp 226 of a smaller diameter suited to the size of the motor, and carried by a pair of mounting brackets 228 bolted to the lower ends of the extensible legs 50—52. The cross-section of the C-clamp is shaped to fit the split ring collar as shown in Fig. 7, and to provide shouldered interengagement therewith to firmly hold the motor-pump unit in place. As in Fig. 1, the free ends of the C-clamp 226 are interconnected and the clamp is drawn tight about the motor-pump unit by a wire spring member 230 and a toggle lever 232.

The invention claimed is:

1. Mounting means for an accessory such as a motor-pump unit in a fuel tank having an access opening in the top wall thereof, comprising a bracket support adapted to be mounted at the top of the tank, a pair of depending spaced legs rigidly carried by said plate, a C-shaped clamp member secured to and interconnecting the lower ends of said legs, said clamp being open at one side to pass the discharge conduit of the pump and having at its inner face a circumferentially-disposed shouldered clamping seat for the reception of an interfitting circumferential mounting face on a motor-pump unit received therein, and a tension latch for interconnecting the free ends of the C-clamp and drawing the clamp into clamping engagement about said mounting face, said legs and C-clamp being sufficiently flexible to pass the said mounting face to said seat and to permit said clamp to be contracted tightly thereabout to firmly clamp a motor-pump unit therein to support the same in the tank, and said C-clamp when clamped about a supported unit serving to interconnect said legs as a stiffening brace.

2. Mounting means according to claim 1 in which said legs are extensible and are provided with means to releasably lock the same in selected positions of adjustment.

3. Mounting means according to claim 1 wherein said legs are spaced to lie outside said C-clamp, and said clamp is secured thereto by releasable means, said legs providing a plurality of positions therealong for supporting said clamp at a plurality of selected elevations.

4. Mounting means for an accessory such as a motor-pump unit in a fuel tank having an access opening in the top wall thereof, comprising a bracket support adapted to be mounted at the top of the tank, a depending hanger carried by said bracket support, a C-clamp fixed to said hanger, said C-clamp being open at one side to pass a pump conduit or the like during insertion of a unit in the clamp, and said clamp having at its inner face a circumferentially disposed clamping seat for the reception of a circumferential mounting face of a unit mounted therein, and a tension latch for releasably connecting the free ends of the C-clamp to draw the same together and contract the clamp about the mounting face of a motor-pump unit received therein.

5. Mounting means according to claim 4 in which the C-clamp seat includes a flanking shoulder portion which lies in radially interfering relation with the motor-pump mounting face and the C-clamp is openable to pass the motor-pump face to seated position.

6. Mounting means according to claim 4 in which the C-clamp seat includes a circumferential inwardly open concave groove, in combination with a motor-pump unit having a circumferential outwardly convex mounting face interfitting in said groove.

7. Mounting means according to claim 4 in which the tension latch comprises an elastic toggle link and an over-center toggle latch releasably connected between the free ends of the C-clamp.

8. Mounting means for supporting and locating an electric fuel pump in a tank, comprising a mounting bell to be affixed to the top wall of the tank and defining an opening surrounded by a cover-receiving flange, a removable cover member for reception on said flange to close said opening, said flange and cover over at least a portion of the periphery thereof being offset inward from the edge of said bell to leave an exposed top wall portion on the affixed mounting bell, a hanger depending from said cover member, an electric pump carried by said hanger, an electric supply line connected to said electric pump and having a terminal support on said cover member, a discharge fitting mounted on the said exposed top wall portion of the said mounting bell and adapted to be permanently connected to a fuel line externally of the tank, and a discharge conduit connecting said electric pump and discharge fitting inside the tank and including a readily releasable connection.

9. Mounting means for supporting and locating an electric fuel pump in a tank, comprising a mounting bell to be affixed to the top wall of the tank and defining an opening surrounded by a cover-receiving flange, a cover member for reception on said flange to close said opening, said flange and cover over at least a portion of the periphery thereof being offset inward from the edge of said bell to leave an exposed top wall portion on the mounting bell, a hanger depending from said cover member, an electric pump carried by said hanger, an electric supply line connected to said electric pump and having a terminal support on said cover member, a discharge fitting mounted on the said exposed top wall portion of the mounting bell and adapted to be connected to a fuel line externally of the tank, and a discharge conduit connecting said electric pump and discharge fitting inside the tank and including a readily releasable connection, said hanger comprising a pair of spaced depending legs rigidly affixed to said cover member, a C-clamp connected to said legs for supporting the electric pump therefrom, said C-clamp having an open side to facilitate insertion of an electric pump therein, having a circumferential seat for circumferential engagement of a mounting face on the pump unit, and a tension latch releasably connecting the free ends of the C-clamp to draw the same together to tighten the clamp about a pump unit received therein.

10. Mounting means according to claim 8, in which said mounting bell is substantially circular and said opening and cover are substantially D-shaped to leave an exposed top wall segment between the circular periphery of the bell and the chordal edge of the cover.

References Cited in the file of this patent

UNITED STATES PATENTS 2,547,761    Korte _____ Apr. 3, 1915